A. Whiteley,
Belt Fastener,
N° 14,213.
Patented Feb. 5, 1856.
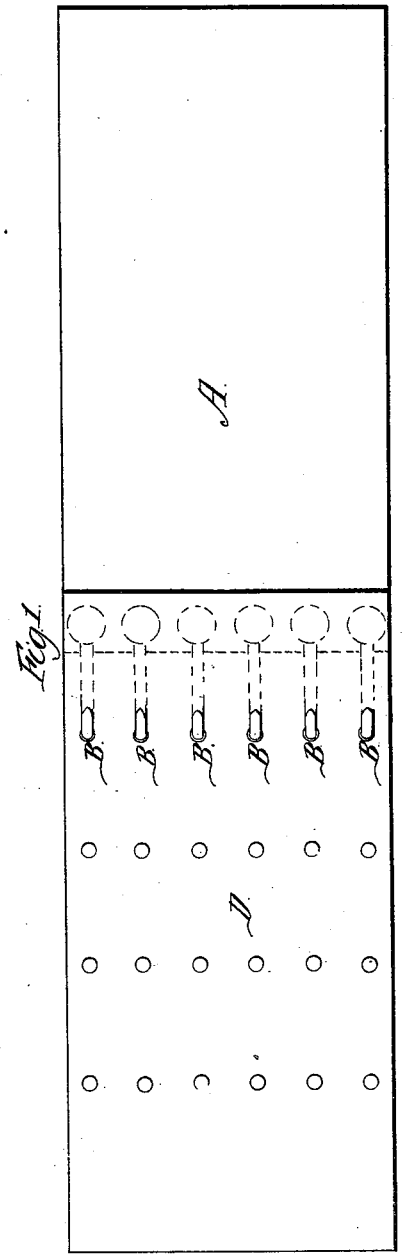
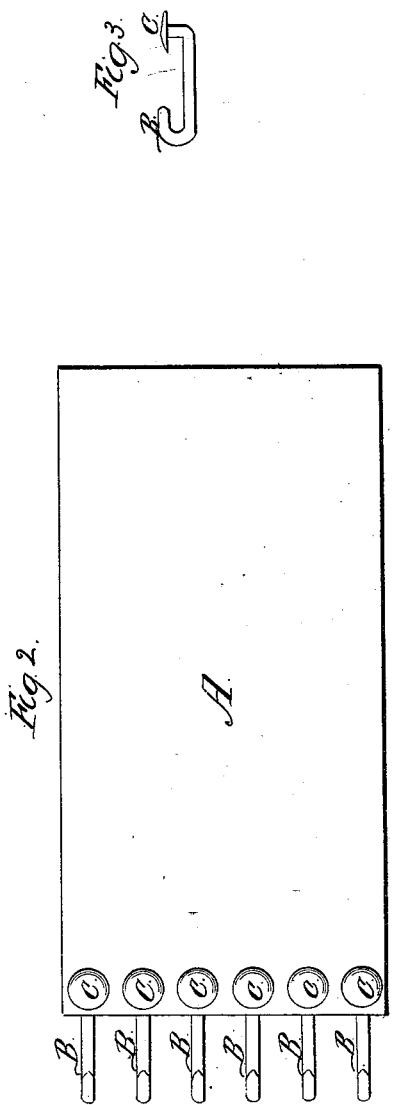

UNITED STATES PATENT OFFICE.

ABNER WHITELEY, OF SPRINGFIELD, OHIO.

BELT-FASTENING.

Specification of Letters Patent No. 14,213, dated February 5, 1856.

*To all whom it may concern:*

Be it known that I, ABNER WHITELEY, of Springfield, in the county of Clark and State of Ohio, have invented a new and useful Improvement in Belt-Fastenings; and I do hereby declare that the following is a full, clear, and exact description of the construction and operation of the same, reference being had to the annexed drawings, making a part of this specification, in which—

Figure 1 is a face view of a belt connected by means of said fastening. Fig. 2 is a view of the end of the belt containing the hooks or fastenings. Fig. 3 is a side view of one of the hooks detached.

The object of this improvement is to secure the passage of the belt between side guides and avoid difficulty in catching against said guides, as a buckle will and to permit the belt to be taken up and let out without cutting off the end and splicing again to let it out. The buckle admits of the belt being taken up and let out without cutting off the end but will not pass through side guides; neither will a buckle use the whole strength of a belt as there cannot be more than three tongues used and they will slit or cut the belt as the center of the buckle will give if the belt is wide and three points are not sufficient in a wide belt; hooks and eyes may be used but they must be used at the ends of the belt and if it is desired to shorten the belt the end must be cut off and spliced to lengthen as they are made to be permanently fastened in. A belt fastened with a thong will pass between side guides but the belt must be cut to shorten it and spliced to lengthen it and requires much time to make the change. Now this fastening is designed to obviate all these difficulties and permits the belt to be taken up and let out in less time and with greater ease than any other mode and the belt is also more easily filled with this kind of fastening as a punch is all that is necessary in filling, and as each hook forms an independent support all parts of the belt are equally strained and said fastening accommodates itself to the expansion and contraction of the belt in width.

A is that portion of the belt containing the hooks and has a set of holes near the end through which they pass.

B, B, B are hooks having a flat head on one end and a short bend near the head at a right angle to that portion which joins the head, and a short hook at the other end. Said hooks are passed through the holes in the end of A bringing the heads, C, C down flat on A, where by means of the flat head on one side and the bar at a right angle on the other side they become so fixed in the end of the belt that they will retain their place in that end of the belt when the other end is being unhooked or hooked in and also will not loose out when the belt is unhooked as either the curved ended bracket like hooks or S shaped hooks will which in being unhooked are as likely to come loose at one end as at the other and a set of half a dozen could scarcely be unhooked at one end without unhooking part of them at the other end and then in reaping and threshing machines belts which must be taken off the machines and put under shelter every night such hooks would constantly be coming out and getting lost; besides all this the points over which the end of the belt lies, would soon wear holes through the end of the belt and injure it.

C, is the head on the hook. D, is that portion of the belt which receives the hooks. The head, C, is made flat to permit the end of the belt, D, to be smooth on them when running under guide rollers.

The operation of this improvement is as follows: The hooks, B B, B, being passed through any set of holes in D, the belt is fastened ready to go on the pulleys, (the loose end should always follow after the hooks B, B, B, in running so as to avoid its catching against the guides.) Now it will be seen that the D, will always cover the heads, C, C, C, and make it run smoothly under guide rollers and the hooks B, B, B, having no part of them extending out to the edge of A, it is impossible for them to catch or interfere with the side guides and all that is necessary in taking up or letting out the belt is to remove the hooks B, B, B, to the desired set of holes and when hooked in the belt is ready for the pulleys as before.

Having thus described my improvement what I claim and desire to secure by Letters Patent is—

The hook B, made as described and for the purposes set forth.

In testimony whereof I have signed my name before two subscribing witnesses.

ABNER WHITELEY.

Witnesses:
JOHN L. SMITH,
O. C. WILLSON.